United States Patent
Yoshida et al.

(10) Patent No.: US 9,481,021 B2
(45) Date of Patent: Nov. 1, 2016

(54) LOAD-APPLYING DEVICE, PRESS-FORMING DIE, AND PRESS-FORMING METHOD

(75) Inventors: Tohru Yoshida, Tokyo (JP); Daisuke Toyoda, Koriyama (JP)

(73) Assignees: NIPPON STEEL & SUMITOMO METAL CORPORATION, Toko (JP); H-ONE CO., LTD., Saitama-shi (JP)

( * ) Notice: Subject to any disclaimer, the term of this patent is extended or adjusted under 35 U.S.C. 154(b) by 494 days.

(21) Appl. No.: 14/001,343

(22) PCT Filed: Feb. 24, 2012

(86) PCT No.: PCT/JP2012/054582
§ 371 (c)(1),
(2), (4) Date: Aug. 23, 2013

(87) PCT Pub. No.: WO2012/117967
PCT Pub. Date: Sep. 7, 2012

(65) Prior Publication Data
US 2013/0327115 A1    Dec. 12, 2013

(30) Foreign Application Priority Data
Feb. 28, 2011 (JP) .................... 2011-042770

(51) Int. Cl.
*B21D 22/02* (2006.01)
*B21D 24/06* (2006.01)
(Continued)

(52) U.S. Cl.
CPC .............. *B21D 22/02* (2013.01); *B21D 22/22* (2013.01); *B21D 24/02* (2013.01); *B21D 24/06* (2013.01); *B21D 24/12* (2013.01); *F16F 1/32* (2013.01)

(58) Field of Classification Search
CPC ...... B21D 24/02; B21D 24/04; B21D 24/06; B21D 24/10; B21D 24/12; B21D 22/22; B21D 22/02; B21D 22/20; B21D 24/00; B21D 22/00; F16F 1/32; F16F 3/02
See application file for complete search history.

(56) References Cited

U.S. PATENT DOCUMENTS

| | | | | | |
|---|---|---|---|---|---|
| 1,827,440 | A | * | 10/1931 | Rode | B21D 24/02 267/130 |
| 2,084,456 | A | * | 6/1937 | Rode | B21D 24/06 267/119 |
| 2,387,266 | A | * | 10/1945 | Holland | F16F 1/32 267/162 |

(Continued)

FOREIGN PATENT DOCUMENTS

| | | |
|---|---|---|
| CN | 201279549 Y | 7/2009 |
| JP | 64-071530 A | 3/1989 |

(Continued)

OTHER PUBLICATIONS

Chinese Office Action and Search Report for Chinese Application No. 201280010469.2, dated Sep. 28, 2014, with an English translation of the Chinese Search Report.

(Continued)

*Primary Examiner* — Shelley Self
*Assistant Examiner* — Mohammad Yusuf
(74) *Attorney, Agent, or Firm* — Birch, Stewart, Kolasch & Birch, LLP

(57) ABSTRACT

A load-applying device of a press-forming die includes a rod which includes a first end, a second end, and a flange, a lamination coned disc spring in which a plurality of coned disc springs having a center hole, to which the first end of the rod is inserted, are laminated, a first plate which includes a first through hole to which the first end of the rod is inserted and abuts the lamination coned disc spring, a second plate which includes a second through hole to which the second end of the rod is inserted and abuts the flange; and a gap fixing member which is detachably provided between the first plate and the second plate and fixes a gap between the first plate and the second plate so as to maintain the gap by which the lamination coned disc spring biases the flange to the second plate. The second end and the first plate relatively move in a mutually approaching direction during press-forming, and the lamination coned disc spring is compressed.

8 Claims, 12 Drawing Sheets

(51) Int. Cl.
 *B21D 24/02* (2006.01)
 *B21D 24/12* (2006.01)
 *B21D 22/22* (2006.01)
 *F16F 1/32* (2006.01)

(56) References Cited

U.S. PATENT DOCUMENTS

| | | | | |
|---|---|---|---|---|
| 2,708,110 | A * | 5/1955 | Clay | F16F 1/32 267/162 |
| 2,821,380 | A * | 1/1958 | Strandberg | F16F 1/32 267/2 |
| 3,942,354 | A * | 3/1976 | Randolph, Sr. | B21D 24/02 72/351 |
| 5,906,361 | A * | 5/1999 | Carranza | F16F 3/02 267/162 |
| 7,243,521 | B2 * | 7/2007 | Aoshima | B21D 24/02 267/130 |
| 2007/0138720 | A1 * | 6/2007 | Evans | F16F 1/32 267/162 |

FOREIGN PATENT DOCUMENTS

| | | |
|---|---|---|
| JP | 2-108519 U | 8/1990 |
| JP | 3-207531 A | 9/1991 |
| JP | 10-305332 A | 11/1998 |
| JP | 2002-321013 A | 11/2002 |
| JP | 2004-237347 A | 8/2004 |
| JP | 2004-344925 A | 12/2004 |
| JP | 2009-195956 A | 9/2009 |

OTHER PUBLICATIONS

International Search Report issued in PCT/JP2012/054582, mailed on May 22, 2012.

* cited by examiner

LOAD-APPLYING DEVICE, PRESS-FORMING DIE, AND PRESS-FORMING METHOD

TECHNICAL FIELD

The present invention relates to a load-applying device for a press-forming die, and the load-applying device applies a load to a die member which is included in the press-forming die used when a metal plate is press-formed. Moreover, the present invention relates to a press-forming die to which the load-applying device is incorporated, and a press-forming method. The load-applying device according to the present invention is disposed in the press-forming die and can simply adjust both of a stroke and an application load.

Priority is claimed on Japanese Patent Application No. 2011-042770, filed on Feb. 28, 2011, and the contents of which are incorporated herein by reference.

BACKGROUND ART

When a sheet metal is press-formed, problems such as a decrease in shape fixability due to a warp (spring back) of a press-formed part or angular variation occur.

In order to decrease the spring back and improve dimensional accuracy of the press-formed part, it is generally known that increasing a blank holding force is effective at the last period of press-forming.

In Patent Document 1, a technology is suggested in which an elastic body such as a spring is disposed in a die member included in a press-forming die and thus, a blank holding force is increased in the last period of press-forming.

In Patent Document 2, a technology is suggested in which a coned disc spring capable of generating a high load even at a low stroke is provided as the spring disposed in the die member included in the press-forming die and thus, a blank holding force which is increased in the last period of press-forming is higher.

CITATION LIST

Patent Documents

[Patent Document 1] Japanese Unexamined Patent Application, First Publication No. 2002-321013
[Patent Document 2] Japanese Unexamined Patent Application, First Publication No. 2004-344925

SUMMARY OF INVENTION

Technical Problem

However, in the press-forming dies suggested in Patent Documents 1 and 2, it is necessary to prepare springs having different spring constants according to an increment of the blank holding force. Moreover, when the places in which the springs are disposed are increased, in most cases, the increments of the blank holding force are different from one another for each place in which the spring is disposed. Therefore, there is a problem that kinds of the springs to be prepared are increased.

Moreover, when adjustment of the increment of the blank holding force is needed after the spring is disposed in the die member, if the spring is exchanged with a spring having a different spring constant, it is necessary to increase the blank holding force to the same magnitude according to the exchanged spring, and thus, changing of the stroke is also needed. In addition, for the adjustment of the stroke, it is necessary to change a depth of a concave portion in which the spring is disposed, and thus, reprocessing of the die member may be needed.

As described above, in order to more greatly increase the blank holding force with a low stroke, the use of the coned disc spring is effective. The increment of the blank holding force is adjusted with the kind and the laminating number of sheets of the coned disc spring, and an application load to the blank holding die member becomes a desired value. Here, if the coned disc springs are laminated, the obtained application load can be changed. However, at the same time, the entire length of the laminated coned disc spring is also changed. Accordingly, adjusting both of the stroke and the application load to a desired value is not easy.

From the situation, in a press-forming die which includes a plurality of die members, when application of a load to a specific die member is needed as such a case where the blank holding force is increased, a load-applying device capable of easily adjusting both of the stroke and the application load is preferable. Moreover, the load-applying device, which can be disposed in the press-forming die as one set of components, is preferable.

An object of the present invention is to provide a load-applying device which applies a load to at least one of a plurality of die members included in a press-forming die, can easily adjust both of a stroke and an application load, and can be disposed in the press-forming die.

Solution to Problem

The gist of the present invention is as follows.

(1) According to a first aspect of the present invention, there is provided a load-applying device of a press-forming die including: a rod which includes a first end, a second end, and a flange which is provided between the first end and the second end; a lamination coned disc spring in which a plurality of coned disc springs having a center hole, to which the first end of the rod is inserted, are laminated; a first plate which includes a first through hole to which the first end of the rod is inserted and abuts the lamination coned disc spring; a second plate which includes a second through hole to which the second end of the rod is inserted and abuts the flange; and a gap fixing member which is detachably provided between the first plate and the second plate and fixes a gap between the first plate and the second plate so as to maintain the gap by which the lamination coned disc spring biases the flange to the second plate. The second end and the first plate relatively move in a mutually approaching direction during press-forming, and the lamination coned disc spring is compressed.

(2) In the load-applying device for a press-forming die according to (1), the rod may include a rod length adjustment member which is detachably mounted on the second end.

(3) In the load-applying device for a press-forming die according to (1) or (2), the first plate may include a first plate thickness adjustment member which is detachably mounted on a surface opposite to the second plate.

(4) In the load-applying device for a press-forming die according to any one of (1) to (3), the flange may include a flange thickness adjustment member which is detachably mounted on the flange.

(5) In the load-applying device for a press-forming die according to any one of (1) to (4), a plurality of the rods and the lamination coned disc springs may be provided.

(6) In the load-applying device for a press-forming die according to any one of (1) to (5), a plurality of the rods and the lamination coned disc springs may be provided, each of the plurality of rods may include a rod length adjustment member which is detachably mounted on the second end side, and a thickness of at least one of a plurality of the rod length adjustment members may be different from the thicknesses of other rod length adjustment members.

(7) According to a second aspect of the prevent invention, there is provided a press-forming die including: a first die member which is disposed above a metal plate to be processed; a second die member which is disposed below the metal plate; a blank holding die member which presses the metal plate to the first die member or the second die member during press working; and the load-applying device according to any one (1) to (6) which is provided between the first die member and the blank holding die member or between the second die member and the blank holding die member.

(8) According to a third aspect of the present invention, there is provided a press-forming method including: disposing a metal plate to be processed by the press-forming die according to (7); and changing at least one of the number of the coned disc springs, a direction of the coned disc spring, a kind of the coned disc spring, a thickness of the flange, a thickness of the first plate, a length of the gap fixing member, and a length of the second end side of the rod in the load-applying device, thereby adjusting a load and a stroke applied to the press-forming die, and performing press-forming.

Advantageous Effects of Invention

According to the aspects, a desired combination of a stroke and an application load can be obtained without preparing a plurality of kinds of springs.

Moreover, the load-applying device of a press-forming die can be disposed in the press-forming die as one set of components. Accordingly, a desired load can be applied to a place in which a load is required in the entire press-forming die.

DESCRIPTION OF EMBODIMENTS

The inventors found that a lamination coned disc spring was inserted between two plates in a state where the spring is slightly compressed, and by using a reaction force generated when the lamination coned disc spring was further compressed, a load could be easily and stably applied to a press-forming die compared to the related art.

Hereinafter, an embodiment of the present invention will be described with reference to the drawings based on the above-described findings. First, an object to be applied of a load-applying device for a press-forming die of the present invention will be described.

Figure 1A:
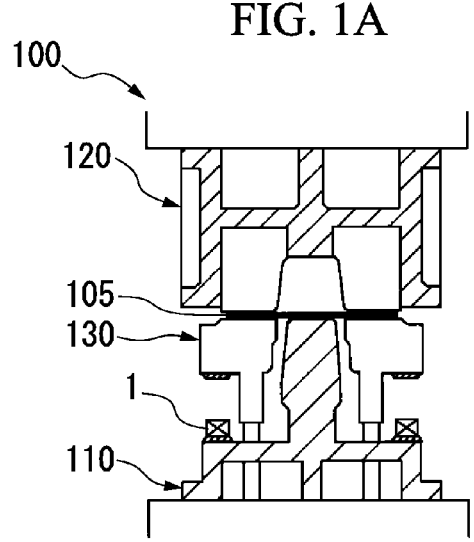
FIG. 1A is a longitudinal cross-sectional schematic view illustrating an operation of a load-applying device 1 according to an embodiment of the present invention and showing a state where a metal plate 105 is placed on a press-forming die 100.
Figure 1B:
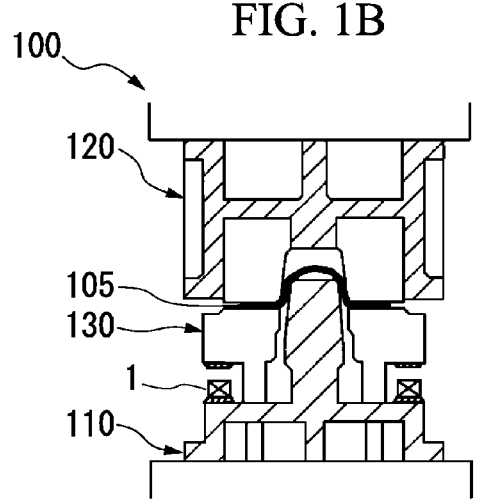
FIG. 1B is a longitudinal cross-sectional schematic view illustrating an operation of the load-applying device 1 according to the embodiment of the present invention and showing a state during drawing the metal plate 105.
Figure 1C:
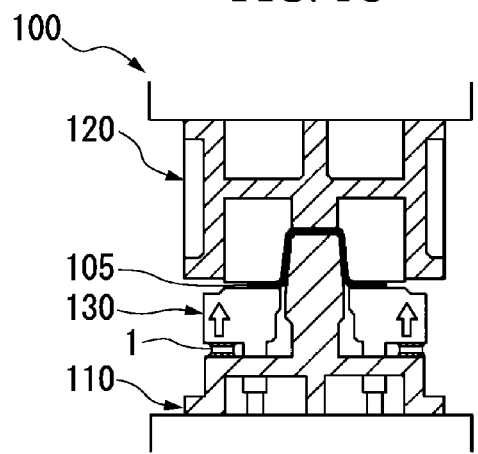
FIG. 1C is a longitudinal cross-sectional schematic view illustrating an operation of the load-applying device 1 according to the embodiment of the present invention and showing a state immediately before the drawing of the metal plate 105 is completed.

FIGS. 1A to 1C are longitudinal cross-sectional views showing a state where a load-applying device 1 for a press-forming die according to an embodiment of the present invention is applied to a press-forming die 100 for performing drawing. Hereinafter, based on FIGS. 1A to 1C, an operation of the load-applying device 1 according to the embodiment of the present invention will be described. FIG. 1A shows a state where a metal plate 105 is placed on the press-forming die 100. FIG. 1B shows a state during the drawing of the metal plate 105. FIG. 1C shows a state immediately before the drawing of the metal plate 105 is completed.

The press-forming die 100 includes a plurality of die members, that is, a punch die member 110, a dice die member 120, and a blank holding die member 130. The load-applying device 1 according to the present embodiment is mounted on the punch die member 110.

As shown in FIG. 1A, the metal plate 105 to be drawn is placed on the blank holding die member 130. As shown in FIG. 1B, the dice die member 120 is lowered, and the drawing of the metal plate 105 starts. Moreover, as shown in FIG. 1C, a portion of the load-applying device 1 according to the present embodiment is pushed by the blank holding die member 130 immediately before the drawing is completed.

At this time, a load shown by a white arrow in FIG. 1C is applied to the blank holding die member 130 included in the press-forming die 100.

According to the load shown by the white arrow, a local additional load separate from the drawing load can be applied to the blank holding die member 130 immediately before the drawing is completed. The load-applying device 1 according to the present embodiment is used for the application of the additional load. In addition, according to the application of the local additional load by the load-applying device 1 of the present embodiment, a blank holding force can be sufficiently applied to the metal plate 105. As a result, quality of a press-formed part is improved.

The load-applying device 1 according to the present embodiment is not limited to the example shown in FIGS. 1A to 1C, and may be also applied to other uses.

Figure 2:
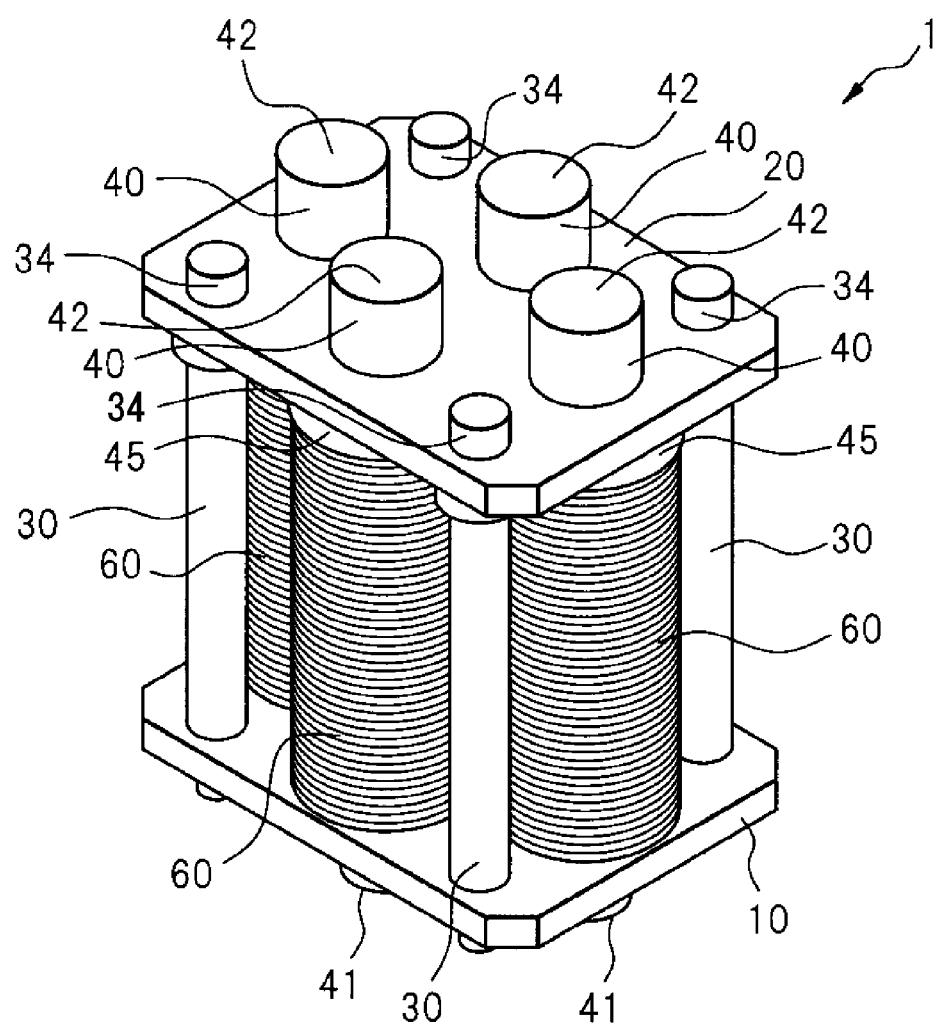
FIG. 2 is a perspective view showing a schematic configuration of the load-applying device 1 according to the embodiment of the present invention.
Figure 3:
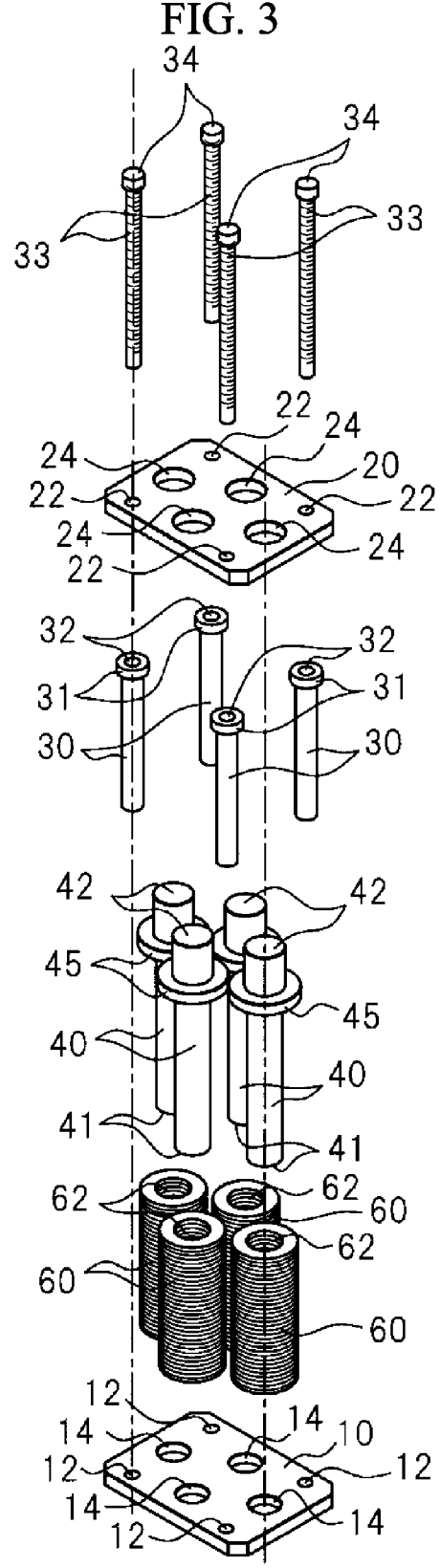
FIG. 3 is an exploded view of the load-applying device 1 according to the embodiment of the present invention.

Next, a structure of the load-applying device 1 according to the present embodiment will be described. FIG. 2 is a perspective view showing an example of a schematic configuration of the load-applying device 1 according to the present embodiment. FIG. 3 is an exploded view of the load-applying device 1 according to the present embodiment.

The load-applying device 1 includes a first plate 10, a second plate 20, gap fixing members 30, rods 40, and lamination coned disc springs 60.

Each of the rods 40 includes a first end 41, a second end 42, and a flange 45. The flange 45 is provided between the first end 41 and the second end 42. The flange 45 may be integrally formed to the rod 40 by cutting or the like, and a separate flange 45 may be fixed to a rod-shaped member by welding or the like.

The rods 40 are inserted to center holes 62 of the plurality of coned disc springs from the first ends 41, and thus, the plurality of coned disc springs are laminated, and lamination coned disc springs 60 are configured.

The first ends 41 of the rods 40 are inserted to first through holes 14 provided in the first plate 10. Moreover, the first plate 10 abuts the lamination coned disc spring 60.

In addition, the second ends 42 of the rods 40 are inserted to second through holes 24 provided in the second plate 20. Moreover, the second plate 20 abuts the flanges 45.

In this way, the lamination coned disc springs 60 are interposed between the first plate 10 and the second plate 20 via the flanges 45. In this state, a biasing force from the lamination coned disc springs 60 is not applied between the first plate 10 and the flange 45.

In the state where the biasing force is not applied, the gap fixing members 30 are disposed between the first plate 10 and the second plate 20. Moreover, the first plate 10 and the second plate 20 are fastened in a mutually approaching direction by bolts 33 which are inserted to through holes 32 provided in the gap fixing members 30.

Finally, the first plate 10, the second plate 20, and the lamination coned disc springs 60 are fixed by the gap fixing members 30 via the flanges 45 in a state where the lamination coned disc springs 60 are slightly compressed. In this way, the gap fixing members 30 are detachably provided between the first plate 10 and the second plate 20 and fix a gap between the first plate 10 and the second plate 20 so as to maintain gaps in which the lamination coned disc springs 60 bias the flanges 45 to the second plate 20. According to this configuration, by relatively moving the first plate 10 and the second ends 42 of the rods 40 in a mutually approaching direction during the press-forming, the lamination coned disc springs 60 can be compressed between the first plate 10 and the flanges 45 of the rods 40, and thus, a reaction force can be obtained.

Figure 4:
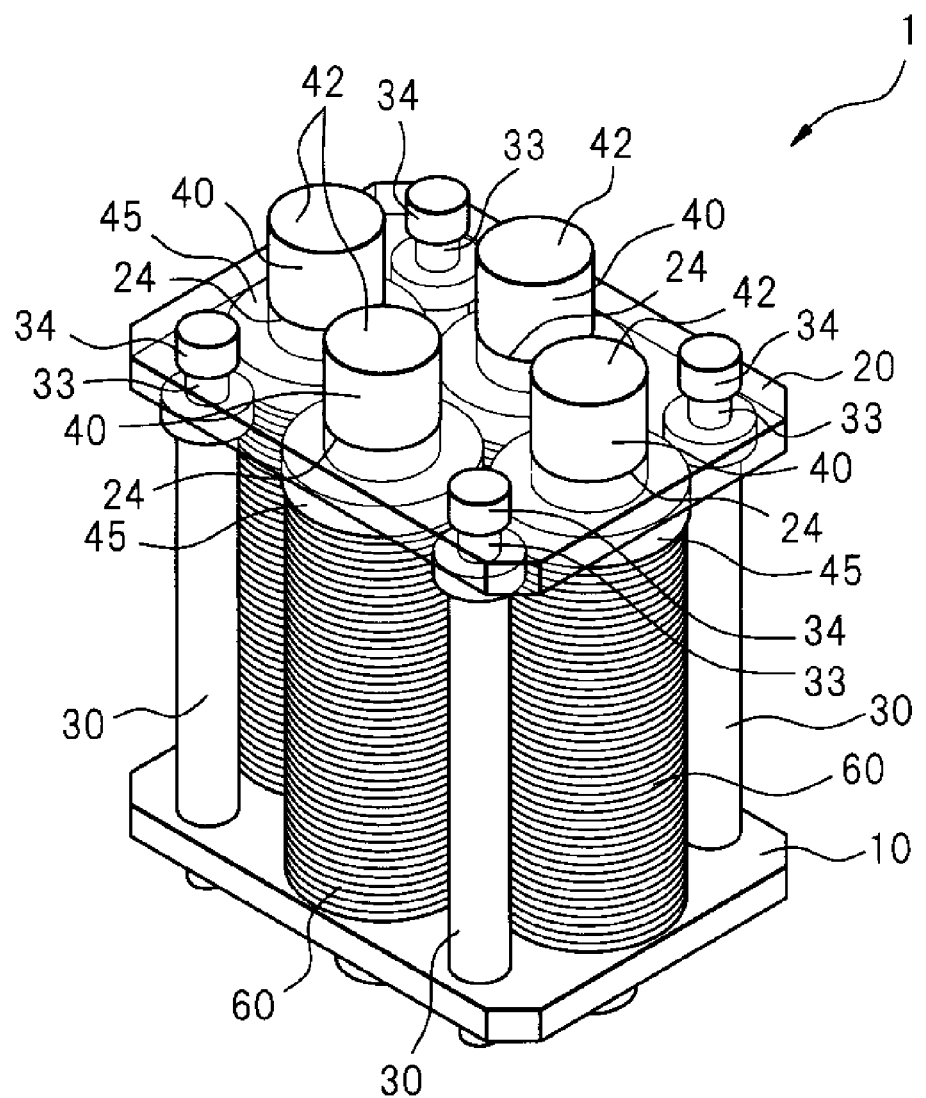
FIG. 4 is an explanation view for easily illustrating a positional relationship of rods 40, a flange 45, and a second plate 20 when the second plate 20 is a semitransparent state in the load-applying device 1 according to the embodiment of the present invention.

FIG. 4 is an explanation view for easily illustrating positional relationships of the rods 40, flanges 45, and the second plate 20 when the second plate 20 is a semitransparent state in the load-applying device 1 according to the embodiment of the present invention.

Since the lamination coned disc springs 60 are slightly compressed, the biasing force is applied between the first plate 10 and the flanges 45, and the flanges 45 are biased toward the second plate 20. The entire length of each of the gap fixing members 30 is set to apply the biasing force. That is, the entire length of each of the gap fixing members 30 is set so that the flanges 45 are biased to the second plate 20 by the lamination coned disc springs 60.

Specifically, the entire length of each of the gap fixing members 30 is determined to be (a lamination height in a state where the lamination coned disc spring 60 is not compressed at all)+(a thickness of the flange 45)−(a compressed length of the lamination coned disc spring 60 when the flange 45 is biased to the second plate 20 by the lamination coned disc spring 60).

Figure 5A:
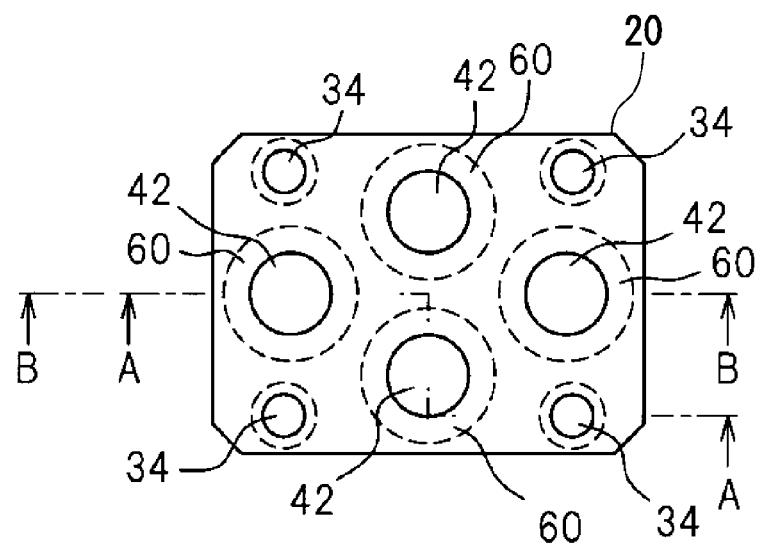
FIG. 5A is a top view of the load-applying device 1 according to the embodiment of the present invention.
Figure 5B:
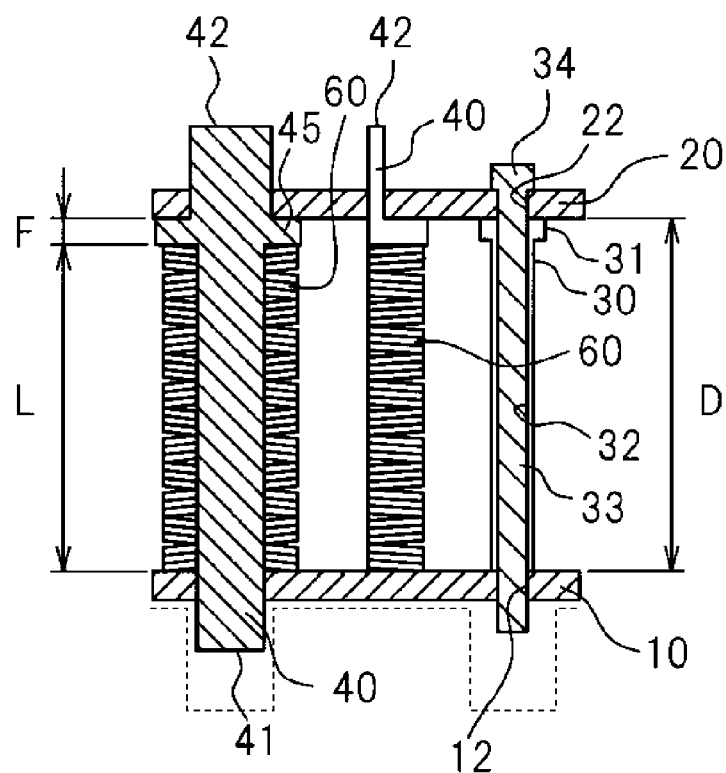
FIG. 5B is an offset cross-sectional view taken along line A-A in FIG. 5A.

FIGS. 5A and 5B are a top view and an offset cross-sectional view of the load-applying device 1 according to the present embodiment respectively. FIG. 5A is the top view. FIG. 5B is the offset cross-sectional view taken along line A-A of FIG. 5A.

In FIGS. 5A and 5B, L is (the lamination height in a state where the lamination coned disc spring 60 is not compressed at all)−(the compressed length of the lamination coned disc spring 60 when the flange 45 is biased to the second plate 20 by the lamination coned disc spring 60). Accordingly, when the length of the gap fixing member 30 is represented by D and the thickness of the flange 45 is represented by F, $D = F + L$ is satisfied.

Here, the compressed length of the lamination coned disc spring 60 when flange 45 is biased to the second plate 20 by the lamination coned disc spring 60 is preferably within a range of 5 to 20% with respect to the compressed length when the lamination coned disc spring 60 is completely compressed. If the range is less than 5%, the biasing force is insufficient, and since lamination coned disc springs move mutually, it is not preferable. On other hand, if the range exceeds 20%, when the press-forming ends and the load-applying device 1 according to the present embodiment does not apply the load to the die member, since the lamination coned disc springs 60 apply excessive dynamic loads to the first plate 10 and the second plate 20, and thus, it is not preferable.

As long as the first plate 10, the second plate 20, and the gap fixing members 30 are fixed to one another, a fixing method is not particularly limited. In the embodiment shown in FIGS. 2 to 7B, as shown in FIG. 5B, bolts 33 are inserted to through holes 22 provided in the second plate 20 and through holes 32 provided in the gap fixing members 30. Moreover, male screws provided in the bolts 33 are screwed to female screws 12 provided in the first plate 10, and washers 34 provided in the bolts 33 and the second plate 20 are fastened. Washers 31 of the gap fixing members 30 are disposed to stably support the first plate 10 and the second plate 20. However, the washers 31 may be omitted.

In the embodiment shown in FIGS. 2 to 7B, 36 one lamination coned disc spring 60 is configured by laminating the coned disc springs. The number of the laminated coned disc springs is not limited to 36. The number of the coned disc springs may be appropriately selected to obtain desired stroke and application load in the entire load-applying device 1 according to the present embodiment. Moreover, similarly, a lamination method of the coned disc springs may also be appropriately selected. For example, there is a serial lamination method in which all coned disc springs configuring one row of the lamination coned disc springs are arranged in the same posture, a parallel-serial lamination method in which some coned disc springs are arranged in reverse postures, or the like. In addition, in the parallel-serial lamination method, a lamination height is increased and a repulsive force (application load) is increased compared to the serial lamination method as the number of the coned disc springs arranged in the reverse posture is increased.

Next, an operation of the load-applying device 1 will be described. In the operation of the load-applying device 1, there is a case where the first ends 41 of the rods 40 are pushed and operated and a case where the second ends 42 are pushed and operated. The "push" means that first ends 41 or the second ends 42 are moved in the directions in which the laminated coned disc springs 60 are compressed. The direction in which each of the lamination coned disc springs 60 is compressed is an axial center direction of the rod 40 which is inserted to the lamination coned disc spring 60. Here, the case where the second ends 42 are pushed will be described.

Figure 6A:
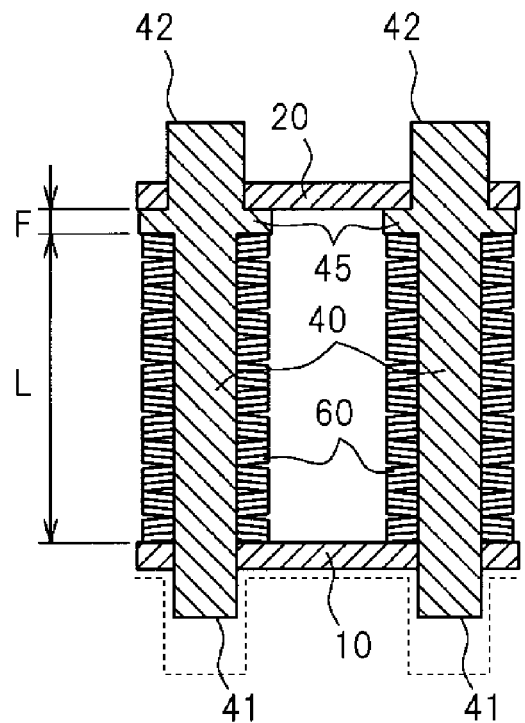
FIG. 6A is a cross-sectional view taken along line B-B in FIG. 5A and shows a state where the flange 45 is biased to the second plate 20.
Figure 6B:
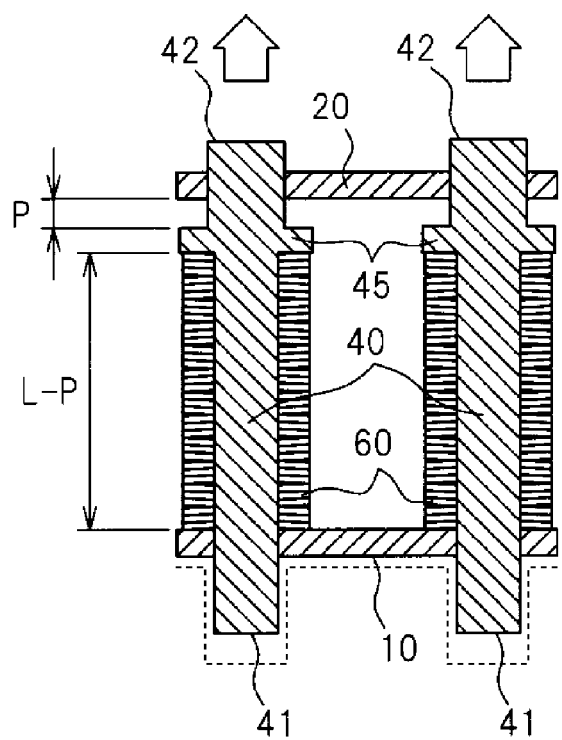
FIG. 6B is a cross-sectional view taken along line B-B in FIG. 5A and shows a state where a lamination coned disc springs 60 are pushed from the state of FIG. 6A.

FIGS. 6A and 6B are cross-sectional views taken along line B-B of FIG. 5A. FIG. 6A shows a state where the flanges 45 are biased to the second plate 20. FIG. 6B shows a state where the lamination coned disc springs 60 are pushed from the state of FIG. 6A.

The second ends 42 are pushed by the die member to which the load is to be applied. As shown in FIGS. 1A to 1C, in the application example in which the load is applied to the blank holding die member 130, the first plate 10 is mounted on the punch die member 110, and the blank holding die member 130 pushes the second ends 42 of the rods 40. Hereinafter, according to this application example, the operation of the load-applying device 1 of the present embodiment will be described.

When the load-applying device 1 according to the present embodiment is not operated, a state (hereinafter, may be also referred to as a "normal state") in which the flanges 45 are biased to the second plate 20 becomes, that is, the entire length of the lamination coned disc spring 60 becomes L. The blank holding die member 130 pushes the second ends 42 of the rods 40 in the direction, in which the lamination coned disc springs 60 are compressed, by a length P from the normal state. As a result, a reaction force shown by a white arrow of FIG. 6B is generated. Moreover, the reaction force acts on the blank holding die member 130 while the blank holding die member 130 pushes the second ends 42. The reaction force acting on the blank holding die member 130 is the application load. Moreover, the length P of FIG. 6B is a stroke.

The application load per one rod 40 is represented by k×P. Here, k is a spring constant of the entire lamination coned disc spring 60 in one rod 40. In the case of the embodiment shown in FIGS. 2 to 7B, k is the spring constant of the entire of 36 coned disc springs which are laminated.

Next, a case where the application load which is larger by k×S than k×P per one rod is modified to be applied to the blank holding die member 130 will be described.

Figure 7A:
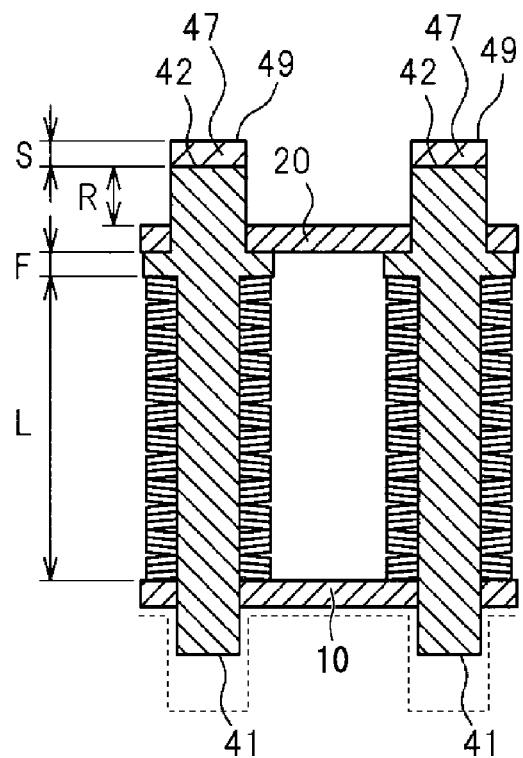
FIG. 7A is a view in which a rod length adjustment member 47 is provided in the cross-sectional view taken along line B-B in FIG. 5A and which shows a state where the flange 45 is biased to the second plate 20.
Figure 7B:
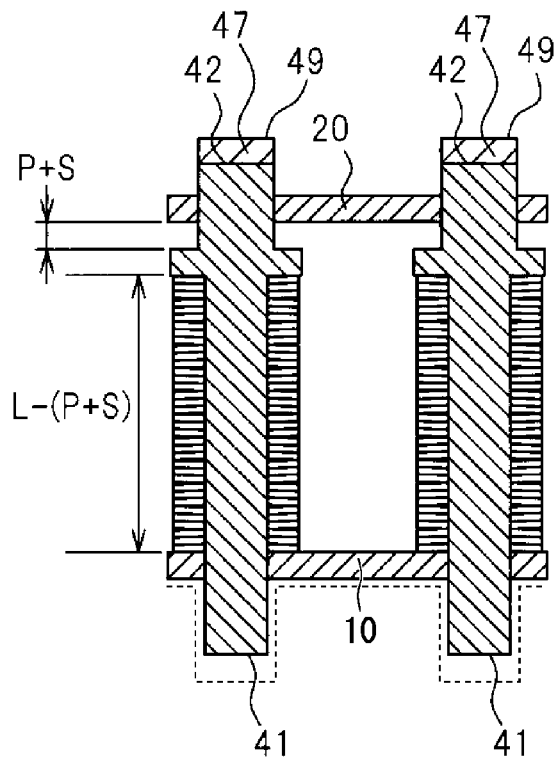
FIG. 7B is a view in which the rod length adjustment member 47 is provided in the cross-sectional view taken along line B-B in FIG. 5A and which shows a state where the lamination coned disc springs 60 are pushed from the state of FIG. 7A.

FIGS. 7A and 7B are views showing the load-applying device 1 according to the present embodiment when rod length adjustment members 47 detachable to the second ends 42 of the rods 40 are mounted. FIGS. 7A and 7B are views showing when the detachable rod length adjustment members 47 are mounted in the cross-sectional view taken along line B-B of FIG. 5A. FIG. 7A shows a state where the flanges 45 are biased to the second plate 20. FIG. 7B shows a state where the lamination coned disc springs 60 are pushed from the state of FIG. 7A.

As shown in FIGS. 7A and 7B, since the thickness of each of the rod length adjustment members 47 is S, the stoke becomes P+S, and the application load of k×(P+S) can act on the blank holding die member 130.

Even when the length R shown in FIG. 7A is changed, that is, even when the protruding length of each of the rods 40 from the second plate 20 in the normal state is changed, similar effects are obtained. However, if a plurality of kinds of rod length adjustment members 47 having different thicknesses S are prepared, the magnitude of the application load can be more easily adjusted, and thus, it is preferable.

Moreover, the entire length (hereinafter, referred to as "the entire length in a normal state") of the load-applying device 1 according to the present embodiment in the normal state can be changed by changing the length of L in the normal state. With respect to the entire length in a normal state, a plurality of kinds of gap fixing members 30 having different lengths D (refer to FIG. 5B) described above may be prepared.

The plurality of kinds of rod length adjustment members 47 having different thicknesses S and the plurality of kinds of gap fixing members 30 having different lengths D are prepared respectively, and thus, a desired combination of the stroke and the application load can be obtained.

In addition, a detachable first plate thickness adjustment member may be mounted on a surface opposite to the second plate side in the first plate 10. With the first plate thickness adjustment member, if a plurality of kinds of first plate thickness adjustment members having different thicknesses are prepared, a desired combination of the stroke and the application load can be more easily obtained.

Moreover, a detachable flange thickness adjustment member may be mounted on each of the flanges 45. Also in the flange thickness adjustment member, if a plurality of kinds of flange thickness adjustment members having different thicknesses are prepared, a desired combination of the stroke and the application load can be more easily obtained.

In this way, by changing at least one of the number of the coned disc springs, the directions of the coned disc springs, the kind of the coned disc springs, the thickness of the flanges 45, thickness of the first plate 10, the lengths of the gap fixing members 30, and the lengths of the second end 42 sides of the rods 30 in the load-applying device 1, the load applied to the press-forming die and the stroke can be easily adjusted.

Moreover, the above described configurations only exemplify the embodiment of the present invention, and various modifications can be applied to the present invention within scope of Claims.

For example, in the above-described explanation, four rods 30 and four lamination coned disc springs are shown as the load-applying device 1. However, the number of the rods 30 and the lamination coned disc springs is not limited to four, and may be one or more.

However, when the number of the rods 30 is plural (two or more), for example, each of the rod length adjustment members having thicknesses different from one another is detachably mounted on the second end 42 side of each rod, and thus, the load-applying device can be easily applied to even a position corresponding to an inclined surface of the die.

When the load-applying device is applied to the position corresponding to the inclined surface of the die, an end of each of the rod length adjustment member contacting the inclined surface of the die has a hemisphere shape or a shape which comes into surface contact with the inclined surface of the die, and thus, the load can be more appropriately applied.

Moreover, in the application example shown in FIGS. 1A to 1C, in a state where the second plate 20 is mounted on the punch die member 110 and the flanges 45 abut the first plate 10, the first ends 41 of the rods 40 may be pushed by the blank holding die member 130.

EXAMPLE

The present invention is further described based on Examples. However, the condition of Example is an example of conditions which are adopted for conforming enablement and effects of the present invention, and the present invention is not limited to the example of the conditions. The present invention can adopt various conditions as long as the object of the present invention can be achieved without departing from the gist of the present invention.

Example 1

Figure 8A:
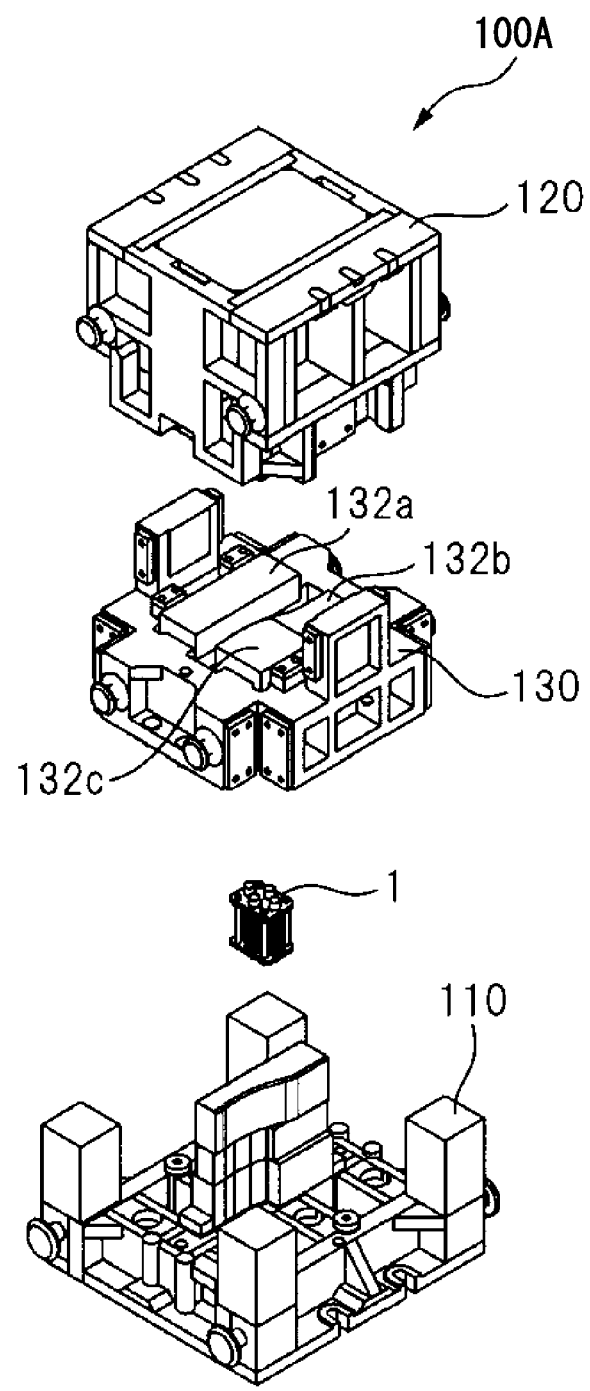
FIG. 8A is an exploded view of a press-forming die 100A in which one load-applying device 1 according to the embodiment of the present invention is disposed.
Figure 8B:
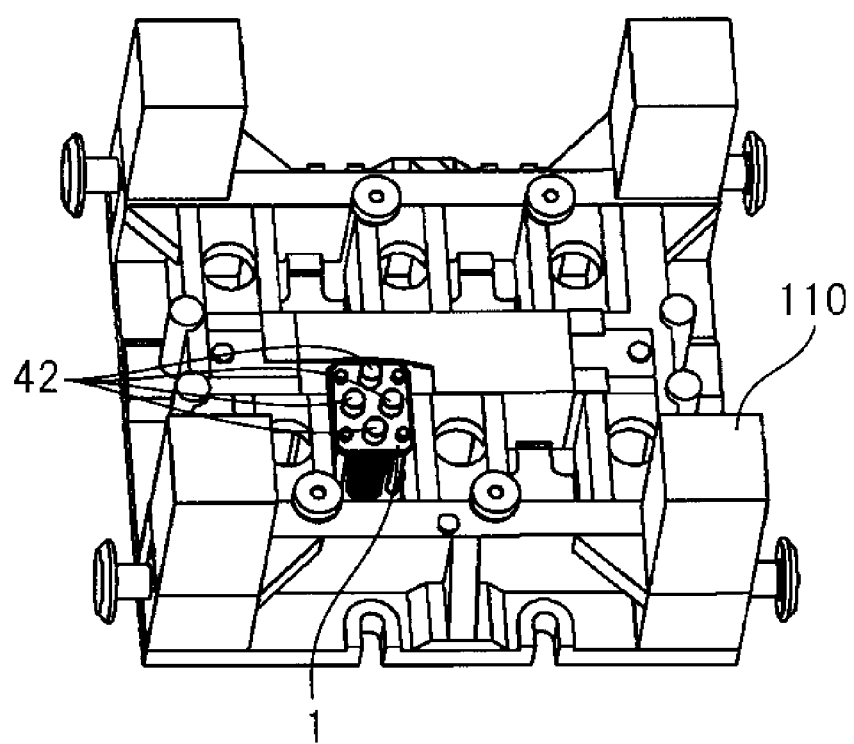
FIG. 8B is a perspective view when the disposition state of the load-applying device 1 according to the embodiment of the present invention is viewed from a dice die member 120 side.

FIGS. 8A and 8B are views showing an example in which one load-applying device 1 shown in FIG. 4 is disposed in a press-forming die 100A. FIG. 8A is an exploded view of the press-forming die 100A. FIG. 8B is a perspective view when the disposition state of the load-applying device 1 shown in FIG. 4 is viewed from the dice die member 120 side.

The press-forming die 100A shown in FIG. 8A includes the punch die member 110, the dice die member 120, and the blank holding die member 130. Moreover, the blank holding die member 130 is divided into three divided die members for blank holding 132a, 132b, and 132c.

In this way, since the blank holding die member 130 is divided into three, the blank holding force can be reliably transferred to the metal plate to be press-formed. In the press-forming die 100A shown in FIG. 8A, one load-applying device 1 is disposed on the punch die member 110 so that, in the last period of the press-forming, a local load is applied only to the divided die member for blank holding 132c among the die members for blank holding 132a, 132b, and 132c divided into three.

The divided die member for blank holding 132c pushes the second ends 42 of four rods 40 in the last period of the press-forming, the divided die member for blank holding 132c receives the reaction force of the lamination coned disc spring 60, and the application load is applied to the divided die member for blank holding 132c. Moreover, the second ends 42 of the rods 40 are pushed, and thus, the first ends 41 further protrude. Concave portions (dashed lines) are provided in the punch die member 110 so that the first ends 41 do not interfere with the punch die member 110 due to the protrusion of the first ends. The concave portions are provided, the first plate 10 is fixed to the punch die member 110, and thus, the load-applying device 1 is disposed in the punch die member 110.

Example 2

Figure 9A:
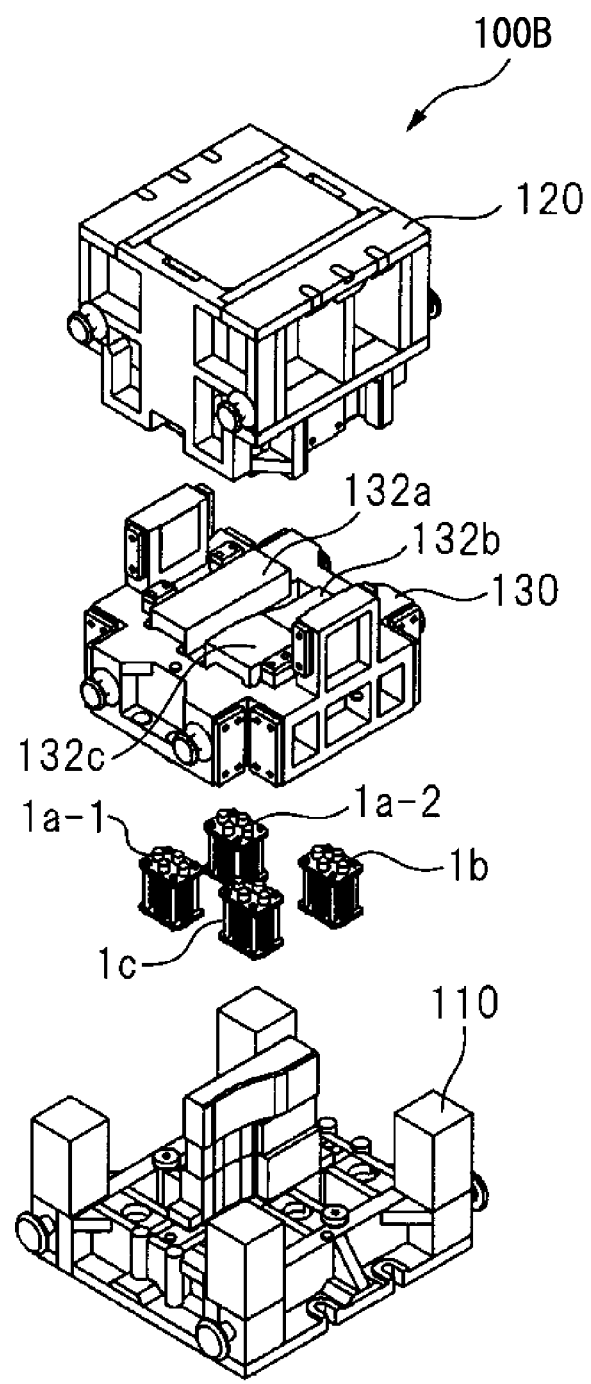
FIG. 9A is an exploded view of a press-forming die 100B in which four load-applying devices 1 according to the embodiment of the present invention are disposed.
Figure 9B:
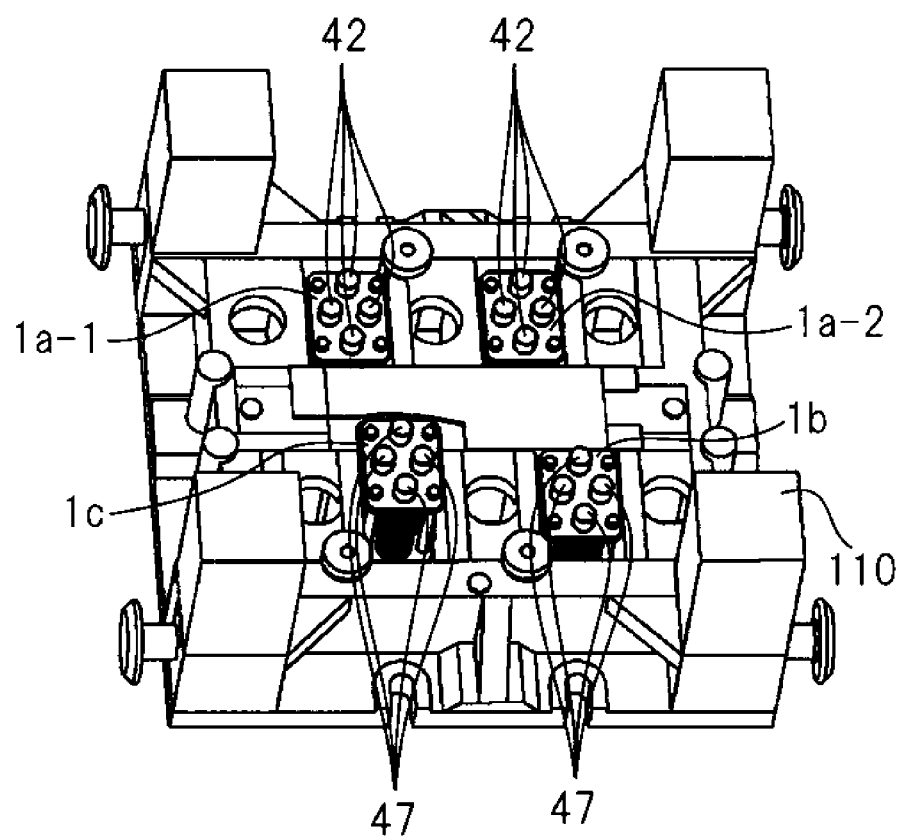
FIG. 9B is a perspective view when the disposition state of the load-applying device 1 according to the embodiment of the present invention is viewed from the dice die member 120 side.

FIGS. 9A and 9B are views showing an example in which four load-applying devices 1 (1a-1, 1a-2, 1b, 1c) shown in FIG. 4 is disposed in a press-forming die 100B. FIG. 9A is an exploded view of the press-forming die 100B. FIG. 9B is a perspective view when the disposition state of the load-applying device 1 shown in FIG. 4 is viewed from the dice die member 120 side.

Except for the number of the disposed load-applying devices 1, the press-forming die 100A shown in FIG. 9A and the press-forming die 100B shown in FIG. 8A are the same as each other. Moreover, in Example 2, rod length adjustment members 47 are detachably mounted on the rods 40 of the load-applying device 1 shown in FIG. 4.

The load-applying devices 1a-1 and 1a-2 apply the application load to the divided die member for blank holding 132a. The load-applying devices 1b applies the application load to the divided die member for blank holding 132b. The load-applying devices 1c applies the application load to the divided die member for blank holding 132c.

The divided die member for blank holding 132a pushes the second ends 42 of eight rods 40 having two load-applying devices 1a-1 and 1a-2 in the last period of the press-forming, the divided die member for blank holding 132a receives the reaction force from the lamination coned disc spring 60, and the application load is applied to the divided die member for blank holding 132a.

In addition, the divided die member for blank holding 132b pushes rod length adjustment members 47 which are mounted on the second ends 42 of four rods 40 included in the load-applying devices 1b in the last period of the press-forming, the divided die member for blank holding 132b receives the reaction force from the lamination coned disc spring 60, and the application load is applied to the divided die member for blank holding 132b.

Also in the divided die member for blank holding 132c, except that the thicknesses of the rod length adjustment members 47 are different those of the rod length adjustment members 47 of the divided die member for blank holding 132b, similar to the load-applying device 1a, the load-applying device 1c is disposed in the punch die member 110.

In this way, when the metal plate is press-formed by the press-forming die 100B in which four load-applying devices 1 (1a-1, 1a-2, 1b, and 1c) are disposed, lengths D (mm) of the gap fixing members 30, the thicknesses S (mm) of the rod length adjustment members, strokes (mm), and application loads (MPa) are shown in Table 1. Moreover, the thickness S of the rod length adjustment member being 0 mm means a state where the rod length adjustment member 47 is not mounted, that is, the state shown in FIGS. 6A and 6B.

TABLE 1

|  | 1a-1 | 1a-2 | 1b | 1c |
|---|---|---|---|---|
| Length of Gap Fixing Member, D (mm) | 160 | 160 | 160 | 159 |
| Thickness of Rod Length Adjustment Member, S (mm) | 0 | 0 | 4 | 5 |

TABLE 1-continued

|  | 1a-1 | 1a-2 | 1b | 1c |
| --- | --- | --- | --- | --- |
| Stroke (mm) | 6 | 6 | 10 | 10 |
| Application Load (MPa) | 111 | 111 | 189 | 208 |

As is obvious from Table 1, it was confirmed that both of the stroke and the application load could be changed by changing the thickness S of the rod length adjustment member 47 (including the case where the rod length adjustment member 47 was not mounted) and the length D of the gap fixing member 30, that is, by changing S+D.

Moreover, it was confirmed that application loads different from one another could act on three divided die members for blank holding 132a, 132b, and 132c.

Accordingly, it was confirmed that the load-applying devices 1 were disposed in the press-forming die 100, and as the additional load separate from the press-forming load, the load having the necessary magnitude could be applied to the die member in which a local load application is required in the last period of the press-forming among the plurality of die members included in the press-forming die 100.

(Verification of Effects of Examples 1 and 2)

The following Steel sheets A to C were prepared.

TABLE 2

|  | Steel Kind | Standard | Sheet Thickness (mm) | Yield Point (MPa) | Tensile Strength (MPa) | Elongation (%) |
| --- | --- | --- | --- | --- | --- | --- |
| Steel Sheet A | General Cold Rolled Steel Sheet | JIS G3141 SPCD | 1.0 | 153 | 315 | 47 |
| Steel Sheet B | High Strength Cold Rolled Steel Sheet | JSC 440W | 1.0 | 364 | 468 | 35 |
| Steel Sheet C | High Strength Cold Rolled Steel Sheet | JSC 590Y | 1.0 | 374 | 614 | 30 |

Figure 10:
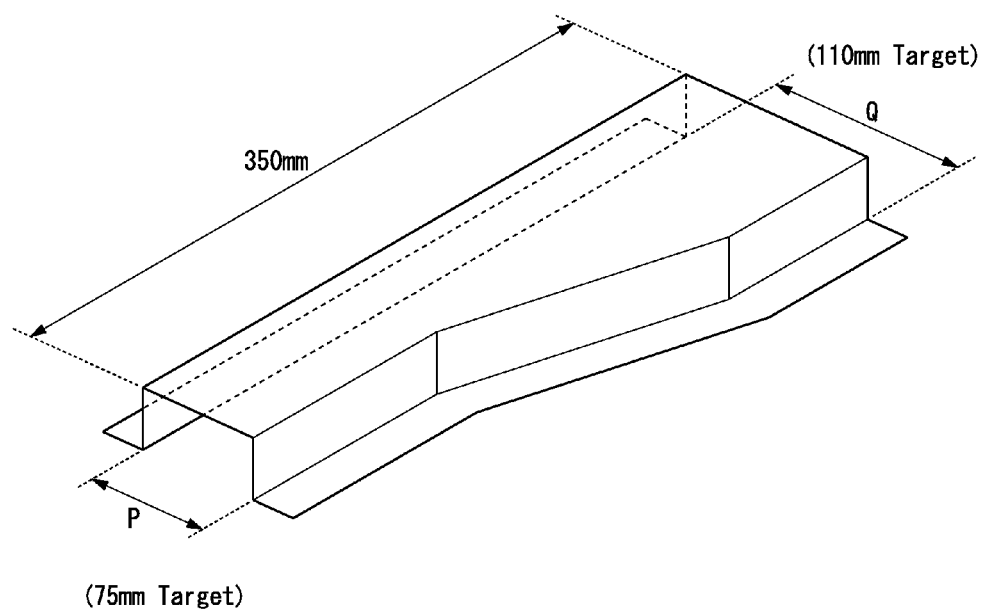
FIG. 10 is a perspective view of a hat-shaped cross-sectional member which is formed by Example of the present invention and Comparative Example.

In Comparative Examples A to C, the steel sheets A to C were formed in the state where the load-applying device was removed in the die structure shown in FIG. 8A, and a hat-shaped cross-sectional member shown in FIG. 10 was press-formed. In the shape shown in FIG. 10, a target value of a distance P was set to 75 mm, and a target value of a distance Q was set to 110 mm.

In Examples 1A to 1C, the steel sheets A to C was formed using the die structure shown in FIG. 8A, and the hat-shaped cross-sectional member having the shape shown in FIG. 10 was press-formed.

In Examples 2A to 2C, the steel sheets A to C were formed using the die structure shown in FIG. 9A, and the hat-shaped cross-sectional member having the shape shown in FIG. 10 was press-formed.

With respect to Comparative Examples A to C, Examples 1A to 1C, and Examples 2A to 2C, the distances P and distances Q of the hat-shaped members after the forming were measured, and thus, a spring back amount was evaluated. The results are shown in Table 3 below.

TABLE 3

|  | Steel Sheet | Load-applying Device | Distance P (mm) | Distance D (mm) |
| --- | --- | --- | --- | --- |
| Comparative Example A | Steel Sheet A | Not Present | 82.2 | 119.1 |
| Comparative Example B | Steel Sheet B | Not Present | 89.6 | 126.0 |
| Comparative Example C | Steel Sheet C | Not Present | 93.0 | 132.8 |
| Example 1A | Steel Sheet A | One (FIG. 8A) | 76.8 | 112.8 |
| Example 1B | Steel Sheet B | One (FIG. 8A) | 78.7 | 115.8 |
| Example 1C | Steel Sheet C | One (FIG. 8A) | 81.5 | 118.7 |
| Example 2A | Steel Sheet A | Four (FIG. 9A) | 75.8 | 112.5 |
| Example 2B | Steel Sheet B | Four (FIG. 9A) | 77.8 | 113.6 |
| Example 2C | Steel Sheet C | Four (FIG. 9A) | 79.4 | 116.3 |

As shown in Table 3, compared to Comparative Examples A, B, and C in which the load-applying device is not used, it is understood that the spring back amount is improved in Examples 1A to 1C. Moreover, in the Examples 2A to 2C in which the load-applying devices are provided in four places, particularly, it is understood that expansion of the distance P is suppressed.

In this way, compared to the related art, according to the present invention, it is possible to easily achieve improvement of the spring back amount at low cost.

INDUSTRIAL APPLICABILITY

As described above, according to the present invention, both of the stroke and the application load can be easily adjusted. Accordingly, the load-applying device for a press-forming die is disposed at an appropriate position of the press-forming die, values of both of the stroke and the application load are combined to desired values, the local load is applied to a specific die member included in the press-forming die, and quality of the press-formed part can be improved. Therefore, the present invention has high industrial values.

REFERENCE SIGNS LIST

1: load-applying device for press-forming die
10: first plate
12: female screw
14: first through hole
20: second plate
22: through hole
24: second through hole
30: gap fixing member
31: washer
32: through hole
33: bolt
34: washer
40: rod
41: first end
42: second end
45: flange
47: rod length adjustment member
49: surface opposite to second end
60: lamination coned disc spring
62: center hole
100: press-forming die
110: punch die member
120: dice die member
130: blank holding die member 132a, 132b, and 132c: divided die member for blank holding
D: length of gap fixing member
F: thickness of flange
L: length in normal state of lamination coned disc spring
P: stroke

The invention claimed is:

1. A load-applying device in combination with a blank holding die member of a press-forming die, the device comprising:
a rod which includes a first end, a second end, and a flange which is provided between the first end and the second end;
a lamination coned disc spring having a plurality of coned disc springs that are laminated, wherein the coned disc springs have a center hole to which the first end of the rod is inserted;
a first plate which includes a first through hole to which the first end of the rod is inserted, wherein the first plate abuts the lamination coned disc spring;
a second plate which includes a second through hole to which the second end of the rod is inserted, wherein the second plate abuts the flange; and
a gap fixing member which is detachably provided between the first plate and the second plate and fixes a gap between the first plate and the second plate so as to maintain the gap by which the lamination coned disc spring biases the flange to the second plate,
wherein the second end moves in a mutually approaching direction relative to the first plate during press-forming, and the lamination coned disc spring is compressed, and
wherein the load-applying device is configured to apply a load to the blank holding die member during press forming the blank in the press-forming die.

2. The load-applying device for a press-forming die according to claim 1,
wherein the rod includes a rod length adjustment member which is detachably mounted on the second end.

3. The load-applying device for a press-forming die according to claim 1,
wherein the first plate includes a first plate thickness adjustment member which is detachably mounted on a surface opposite to the second plate.

4. The load-applying device for a press-forming die according to claim 1,
wherein the flange includes a flange thickness adjustment member which is detachably mounted on the flange.

5. The load-applying device for a press-forming die according to claim 1,
wherein a plurality of the rods and the lamination coned disc springs are provided.

6. The load-applying device for a press-forming die according to claim 1,
wherein a plurality of the rods and the lamination coned disc springs are provided,
wherein each of the plurality of rods includes a rod length adjustment member which is detachably mounted on the second end side, and
wherein a thickness of at least one of a plurality of the rod length adjustment members is different from the thicknesses of other rod length adjustment members.

7. A press-forming die comprising:
a first die member which is disposed above a metal plate to be processed;
a second die member which is disposed below the metal plate;
a blank holding die member which presses the metal plate to the first die member or the second die member during press working; and
a load-applying device that includes:
a rod which includes a first end, a second end, and a flange which is provided between the first end and the second end;
a lamination coned disc spring having a plurality of coned disc springs that are laminated, wherein the coned disc springs have a center hole to which the first end of the rod is inserted;
a first plate which includes a first through hole to which the first end of the rod is inserted, wherein the first plate abuts the lamination coned disc spring;
a second plate which includes a second through hole to which the second end of the rod is inserted, wherein the second plate abuts the flange; and
a gap fixing member which is detachably provided between the first plate and the second plate and fixes a gap between the first plate and the second plate so as to maintain the gap by which the lamination coned disc spring biases the flange to the second plate,
wherein the second end moves in a mutually approaching direction relative to the first plate during press-forming, and the lamination coned disc spring is compressed, and
the load-applying device is provided between the first die member and the blank holding die member or between the second die member and the blank holding die member.

8. A press-forming method comprising:
disposing a metal plate to be processed by a press-forming die; and
changing at least one of, the number of a coned disc springs, a direction of the coned disc spring, a kind of the coned disc spring, a thickness of the flange, a thickness of the first plate, a length of the gap fixing member, and a length of the second end side of a rod in a load-applying device, thereby adjusting a load and a stroke applied to the press-forming die, and performing press-forming, wherein
the press-forming die includes:
a first die member which is disposed above a metal plate to be processed;
a second die member which is disposed below the metal plate;
a blank holding die member which presses the metal plate to the first die member or the second die member during press working; and
the load-applying device that includes:
the rod which includes a first end, a second end, and a flange which is provided between the first end and the second end;
a lamination coned disc spring having the plurality of coned disc springs that are laminated, wherein the coned disc springs have a center hole to which the first end of the rod is inserted;
a first plate which includes a first through hole to which the first end of the rod is inserted, wherein the first plate abuts the lamination coned disc spring;
a second plate which includes a second through hole to which the second end of the rod is inserted, wherein the second plate abuts the flange; and
a gap fixing member which is detachably provided between the first plate and the second plate and fixes a gap between the first plate and the second plate so as to maintain the gap by which the lamination coned disc spring biases the flange to the second plate, wherein the second end moves in a mutually approaching direction relative to the first plate during press-forming, and the lamination coned disc spring is compressed, and wherein the load-applying device is provided between the first die member and the blank holding die member or between the second die member and the blank holding die member.

* * * * *